US007523900B1

(12) United States Patent
Hlatky

(10) Patent No.: US 7,523,900 B1
(45) Date of Patent: Apr. 28, 2009

(54) MOVABLE BOOK AND TABLE HOLDER

(76) Inventor: John D. Hlatky, 4609 Calvert Ct., Troy, MI (US) 48084

(*) Notice: Subject to any disclaimer, the term of this patent is extended or adjusted under 35 U.S.C. 154(b) by 262 days.

(21) Appl. No.: 11/151,365

(22) Filed: Jun. 13, 2005

(51) Int. Cl.
*F16M 11/00* (2006.01)

(52) U.S. Cl. .................... 248/201; 248/447.2; 248/235; 248/247; 248/220.22; 248/452; 248/453; 248/441.1; 248/200.1; 248/215; 108/42; 108/49; 108/50.11; 108/102; 108/137; 108/143

(58) Field of Classification Search ................. 248/201, 248/447.2, 235, 247, 220.22, 452, 453, 441.1, 248/200.1, 215; 108/49, 42, 143, 137, 50.11, 108/102
See application file for complete search history.

(56) References Cited

U.S. PATENT DOCUMENTS

| | | | | |
|---|---|---|---|---|
| 1,598,569 | A | 8/1926 | Fitzhugh | |
| 1,679,635 | A * | 8/1928 | Steinberg et al. | 5/507.1 |
| 2,006,169 | A | 6/1935 | Harris-Jones | |
| 2,766,087 | A * | 10/1956 | Marcus | 108/49 |
| 2,783,109 | A * | 2/1957 | Frey | 108/43 |
| 3,062,602 | A * | 11/1962 | O'Brien et al. | 5/3 |
| 3,181,483 | A * | 5/1965 | Devitt et al. | 108/25 |
| 3,185,113 | A * | 5/1965 | Nathan et al. | 108/47 |
| 3,346,125 | A * | 10/1967 | Miller et al. | 211/86.01 |
| 3,475,052 | A * | 10/1969 | Kaposi | 297/153 |
| 4,098,486 | A * | 7/1978 | Hornsby | 248/452 |
| 4,591,124 | A | 5/1986 | Hellenbrand et al. | 248/447.2 |
| 4,659,099 | A * | 4/1987 | Malone | 280/304.1 |
| 4,747,142 | A * | 5/1988 | Tofte | 381/27 |
| 5,140,914 | A * | 8/1992 | Bohbot et al. | 108/44 |
| 5,331,904 | A * | 7/1994 | DiSimone et al. | 108/44 |
| 5,427,292 | A * | 6/1995 | Rousch | 224/275 |
| 5,761,753 | A * | 6/1998 | Talbert | 4/559 |
| 5,782,185 | A * | 7/1998 | Frahm et al. | 100/25 |
| 5,810,432 | A * | 9/1998 | Haut et al. | 297/153 |
| 5,873,311 | A * | 2/1999 | Schlattl | 108/44 |
| 5,971,343 | A | 10/1999 | Marlak | 248/441.1 |
| 6,298,793 | B1 * | 10/2001 | Turner et al. | 108/26 |
| 6,419,312 | B1 * | 7/2002 | Flannery et al. | 297/149 |
| 6,425,567 | B2 | 7/2002 | Schütze | 248/452 |

* cited by examiner

*Primary Examiner*—J. Allen Shriver, II
*Assistant Examiner*—Nkeisha J Dumas
(74) *Attorney, Agent, or Firm*—Young Basile

(57) ABSTRACT

A multilayer tray system especially for a hospital bed having side rails includes a first rectangular structure having hooks along each lateral edge for being supported on the top edge of the side rails, the first rectangular structure has cavities formed in the upper surface for disposition of such items as a tissue box, drinking glass or miscellaneous items. A second rectangular tray is selectively connected to the first rectangular support. The second tray has a planar upper surface for providing a writing surface thereon. The tray is aligned relative to the rectangular structure and slidably maintained on the rectangular structure by means of a pair of parallel brackets extending from the lower surface of the tray.

9 Claims, 3 Drawing Sheets

MOVABLE BOOK AND TABLE HOLDER

BACKGROUND OF THE INVENTION

The present invention relates to a selectively moveable book and table holder especially for hospital beds having side rails.

During hospital stays, the patient is provided with little space for placement of reading material, tissue boxes, a beverage glass, flower arrangements and other gifts provided to make the hospital stay pleasurable. Usually space is provided on a movable cart having a tray that can be rolled in front of the patient. However, the movable cart provides only limited space for the above-mentioned items and the tray on the movable cart only has a single planar surface. The items can easily be shifted or spilled when the cart is transferred to and from the patient. Therefore, it is desirable to provide a movable tray that can optionally provide a planar surface for the placement of dinner trays or as a writing or card playing surface. It is also desirable to provide a surface that can hold such items as beverage glasses, flower arrangements, etc. in place without shifting or spilling when the surface is moved to or from the patient. it is further desirable for the writing surface to be optionally removable. It is further desirable to provide a moveable book holder that holds a book in place without effort from the patient.

SUMMARY OF THE INVENTION

It is the intent of the present invention to address the aforementioned concerns. The invention provides a selectively removable book and table holder for a hospital bed having a pair of side rails. The book and table holder includes a rectangular structure having hooks extending from each lateral side of the rectangular structure for supporting the structure on a top edge of the side rails and for sliding along the length of the rails. The book and table holder also includes a tray removably positionable over the rectangular structure, wherein the tray has means for slidably securing the tray on the rectangular structure.

In another aspect of the invention, the means for securing the tray on the rectangular structure includes a pair of parallel bracket connected to the lower surface of the tray and wherein the parallel brackets are spaced slightly greater than the length of the rectangular structure for positioning the brackets on opposing sides of the structure.

In yet another aspect of the invention, the rectangular structure has on upper surface having cavities formed therein for the placement of items.

In another aspect of the invention, a slidable book holder is provided having means to hold a book flat without effort from the patient.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENT

Figure 1:
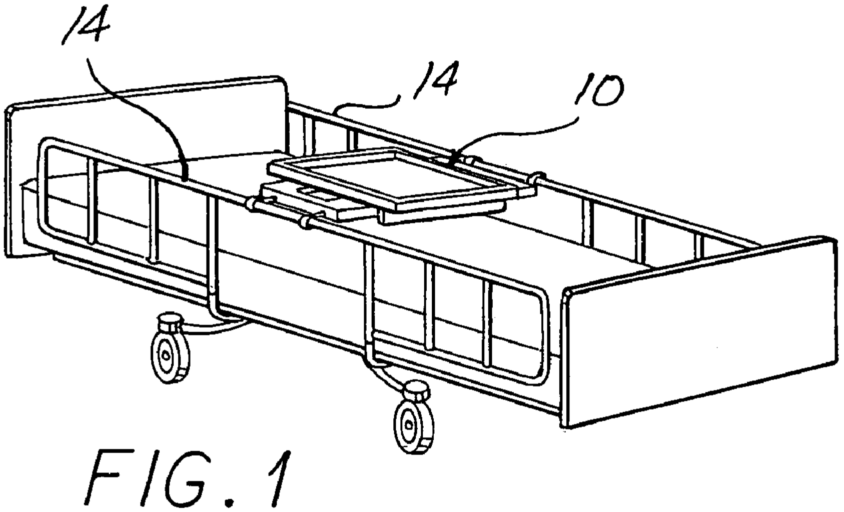
FIG. 1 is perspective view of a hospital bed having side rails and a selectively moveable book and table holder according to the present invention.
Figure 2:
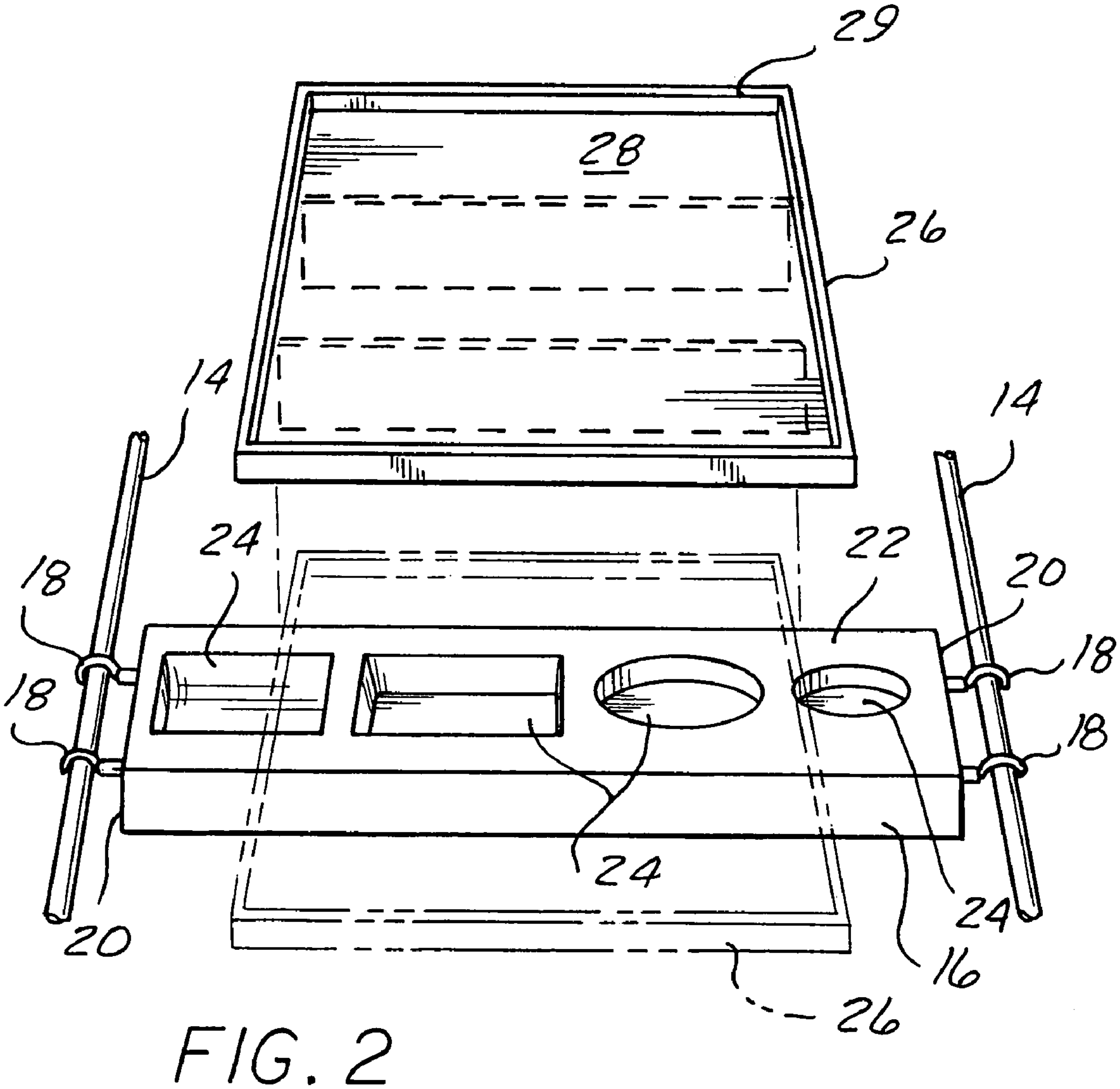
FIG. 2 is an exploded view of the moveable book and table holder shown in FIG. 1 illustrating a rectangular structure having hooks on opposing ends and a removable tray.

In hospitals, a hospital bed 12 is usually provided with side rails 14 to prevent the patient from accidentally falling out of the bed 12. The side rails 14 can provide another benefit by providing a support for a serving tray or a holder of personal items. A rectangular structure which can be used as a tray for serving food, a book rest, or a storage means for the patient can be releasably attached to the side rails and slidably moved along the length of the side rails 14.

Looking at FIGS. 1-5, in the present invention, the rectangular structure 16 has a width (W) approximately the width of the bed 12. Preferably, the rectangular support 16 has a width (W) that is slightly smaller than the width of the bed so that hooks 18 extending from each lateral end 20 of the rectangular structure 16 can hook onto the rails 14. The hooks 18 are sized and configured for encircling the rails. The hooks 18 are configured also to allow the rectangular structure 16 to glide along the upper surface of the rails 14.

The rectangular structure 16 has an upper surface 22 having at least one, but preferably multiple cavities 24 formed therein. The cavities 24 are preferably sized and configured for holding specific items such as a box of tissue, a beverage glass, a waste receptacle and/or a storage area for small items. The cavities capture the aforementioned items and prevent spillage or shifting of the items when the rectangular structure 16 is moved.

To provide further versatility for the patient, a removable tray 26 is provided for setting on the rectangular structure 16. The tray 26 has a rectangular shape and an upper planar surface 28. A lip 29 is preferably located along the periphery of the planar surface 28 of the tray 26 to prevent papers, cards or similar items from sliding off the planar surface 28. The tray 26 further has means for maintaining the tray 26 in sliding communication with the rectangular structure. The planar surface 28 of the tray 26 complements the cavities 24 located in the rectangular structure 16. Having one rectangular member 16 with cavities for holding various items and another rectangular structure 26 providing a planar upper surface 28 provides the patient with the advantage of optionally having a planar surface available for receiving a serving meal tray or for playing a game of cards or as a writing surface; and at the same time having easy access to stored items which are stored in the cavities 24 of the bottom rectangular structure 16.

Figure 3:
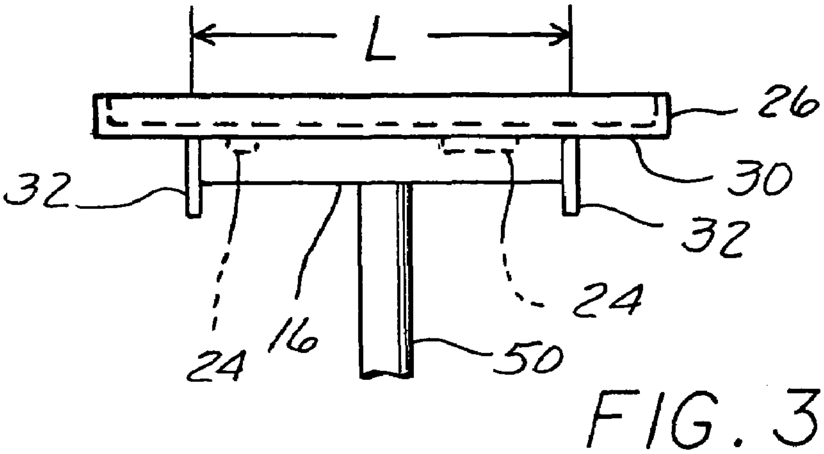
FIG. 3 is a side elevational view of the moveable book and table holder attached to a moveable post.
Figure 4:
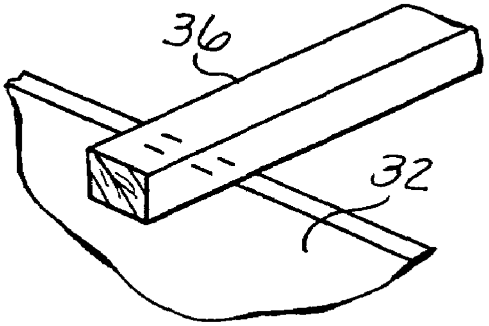
FIG. 4 is a perspective view of a portion of the moveable book and table holder showing the connection of a pair of brackets to a linear brace on the tray.

As stated, supra, the upper tray 26 is provided with means for maintaining the tray 26 in a predetermined orientation relative to the rectangular structure 16. Further, the tray 26 also has means for slidably moving the tray 26 to traverse the rectangular structure 16 between the opposing hooks 18, from one side of the bed 12 to the other side, while maintaining the upper tray in a predetermined orientation relative to the lower rectangular structure 16. The means for maintaining the tray 26 on the rectangular structure 16 includes a pair of parallel brackets 32 spaced from each other at a distance slightly greater than the length (L) of the rectangular structure 16. The brackets 32 are secured to the lower or bottom surface 30 of the tray 26 and orientated perpendicular to the upper and lower surfaces of the tray 26. The brackets 32 may be directly glued, screwed or nailed through the planar surface 28 of the upper tray 26, as shown in FIG. 3. The brackets 32 maintain the tray 26 in proper alignment with the rectangular structure 16 and prevents the tray 26 from sliding off the structure 16.

In another embodiment, it is preferable to attach a wooden brace bar 36 to the bottom surface 30 of the tray. The brace bar 36 preferably extends perpendicular to the axial length of each brackets 32 so that the brace bar 36 can be secured to the lower surface 30 of the tray 26 by means of adhesive, nails, staples, or screws. The brace bar 36 provides added strength at the connection points of the brackets 32 to the tray 26.

Figure 5:
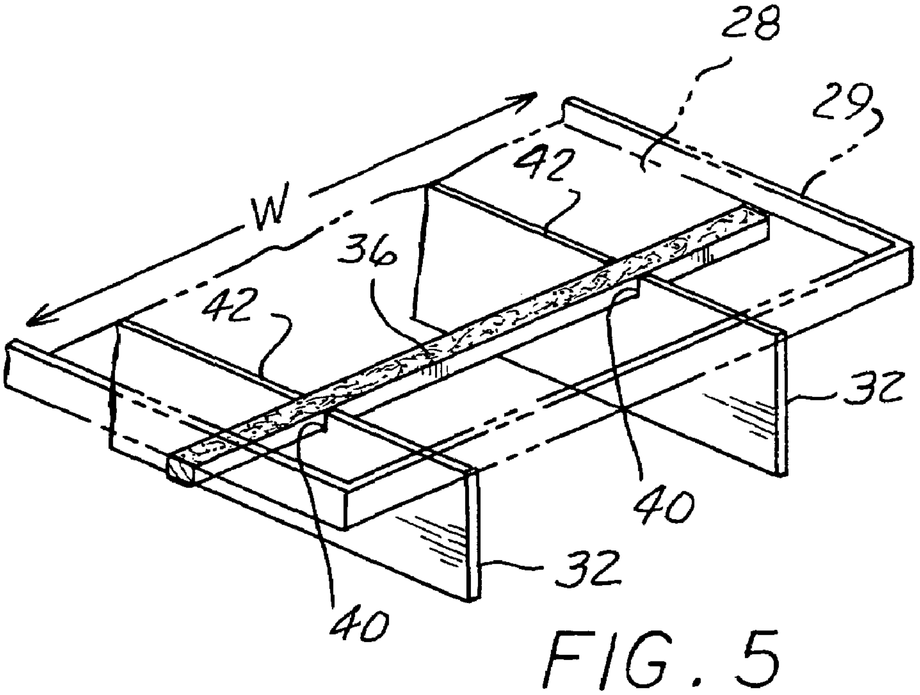
FIG. 5 is a perspective view showing an alternative connection of the pair of brackets to the tray using the linear brace.

In yet another embodiment, as shown in FIG. 5, the brace bar 36 is inserted into notches 40 located within the upper edge of the brackets 32. The notches 40 are configured for snugly receiving a portion of the brace bar 36. The configuration as shown in FIG. 5 allows the upper edges 42 of the brackets 32 to lie adjacent and flush to the lower surface 30 of the tray 26. The brackets 32 may be secured to the brace bar 36 by adhesives, nails, staples, or screws. This configuration provides optimal stability to the brackets 36 and the tray 26. In each of the aforementioned embodiments, adhesive is preferred over nails, screws and staples to eliminate sharp points that can injure a patient.

Although it is preferable to provide the combination rectangular structure 16 and tray 26 with hooks 18 for use on bed rails 14, the combination may also be used on a cart (not shown) that can be moved along the floor adjacent the bed 12. In this embodiment, the rectangular structure 16 can be permanently or releasably mounted on a post 50, as shown in FIG. 3. The post is rightly attached to the moveable cart. The tray 26 is shown sitting on the structure 16, with the brackets 32 disposed on opposing sides of the rectangular structure 16. As can be seen in FIG. 3, the brackets 32 preferably extend below the bottom surface of the rectangular structure 16 so that the tray 26 can not be easily tipped off the structure 16, if excessive weight is placed on one side of the tray 26.

The combination of the dual trays provides a number of advantages over the prior art. The lower tray or rectangular structure 16 is slidable to and from the patient or the head of the bed frame by the hooks 18 that can glide over the rails 14. The brackets 32 configuration on the upper tray 26 allows the upper tray to slide laterally across the width of the rectangular structure 16. The upper tray 26 allows a planar upper surface having multiple uses; and the upper tray 26 may be easily removed from the rectangular structure 16 by merely lifting the tray 26 up and away from the rectangular structure 16.

Figure 6:
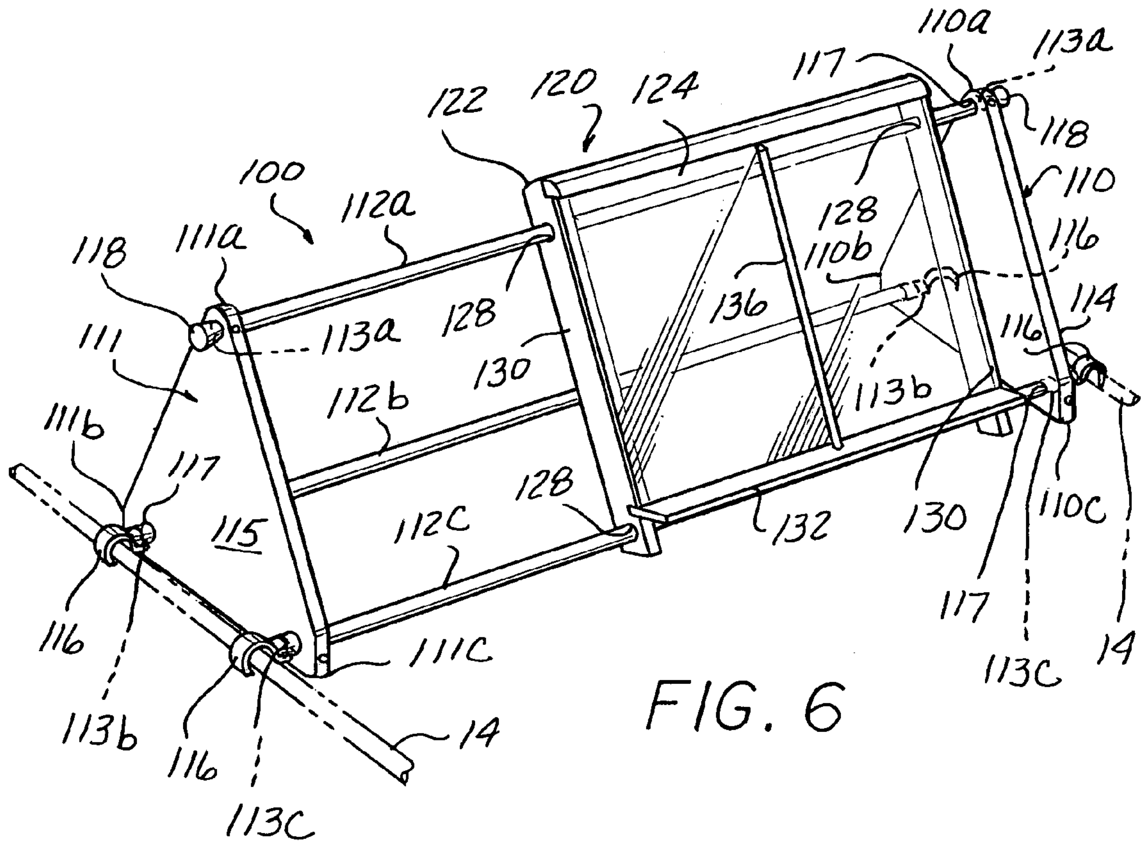
FIG. 6 is a perspective view showing a second embodiment of a moveable book holder according to the present invention.
Figure 7:
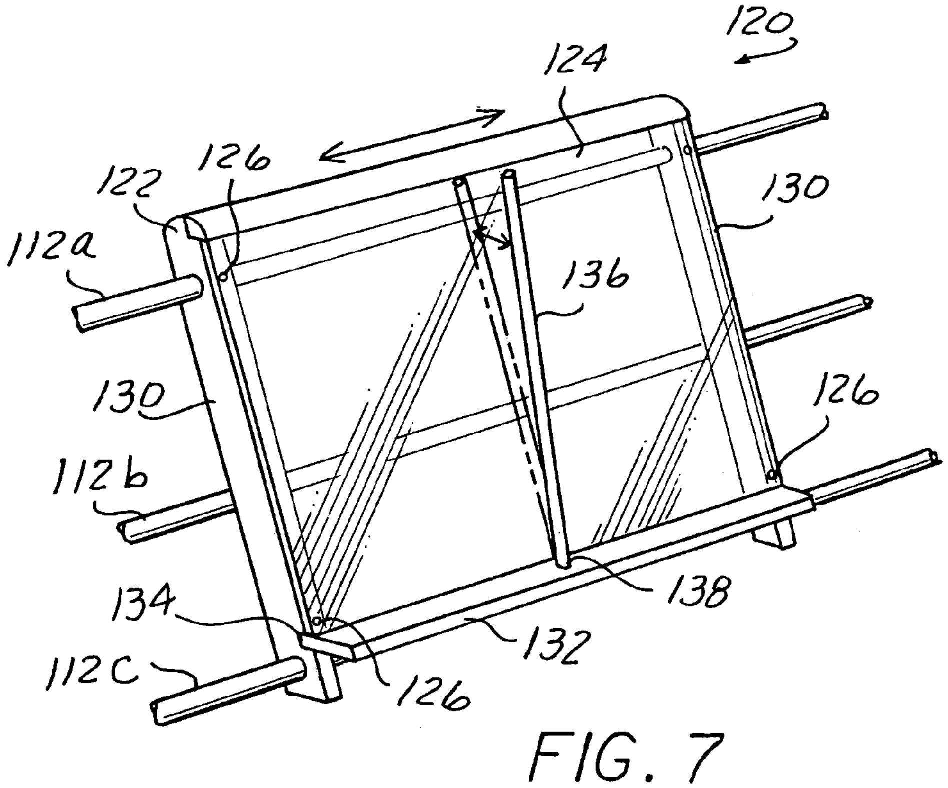
FIG. 7 is a perspective view of a portion of the moveable book holder to show certain features.

Another embodiment for a movable book tray 100 is shown in FIGS. 6 and 7. In this embodiment, a pair of triangular planar members 110, 111 form a base for the moveable book tray 100. The triangular members 110, 111 are preferable made of a wood or resin material. Extending between the two triangular members 110, 111 are tubular members 112*a, b, c*. The tubular members 112*a, b, c* are positioned at each of the three vertexes 110*a, b, c*, 111*a, b, c* of the triangular members 110 and 111. The tubular members 112*a, b, c* have a length approximately equal to the width of the bed. The tubular members 112*a, b, c* provide stability of the structure 100 and allow the tray to be set on a planar surface or supported on the bed rails 14 as discussed hereinafter. The tubular members 112*a, b, c* extend through apertures 117 on the triangular planar members 110, 111 so that the ends 113*a, b, c*, of the tubular members 112*a, b, c* are exposed on the outside planar surfaces 114, 115.

The end portions 1113*a, b, c* of the tubular members 112*a, b, c*, respectively, are exposed through the triangular members 110, 111 so that the two of the tubular members 112*b*, 112*c* are fitted with hooks 116 at each end 113*b, c*. the hooks 116 are configured to be slidingly received on the bed rails 14. Although the holes 116 are shown to form an arcuate configurations, the hooks 116 may also be other shapes, such as an inverted, squared U-shape, to accommodate rails 14 of other shapes. The uppermost triangular member 112*a* has ends 113*a* that are covered with rubber pads or stoppers 118. The rubber stoppers 118 prevent injury from the ends 113*a* of the tubular member 112*a*. The rubber stoppers 118 also prevent the tubular member 112*a* from shifting out of the through apertures 117 in the triangular planar members 110, 111.

When the tray 100 is connected to the bed rails 14, the angle displacement from the plane formed by tubular members 112*b* and 112*c* with tubular member 112*a* is approximate 45-75% to provide an angled surface to facilitate 112*a* reading of a book, magazine or other reading material.

To further facilitate reading a book, the tray 100 further includes a book support 120 slidably moveable horizontally along tubular members 112*a* and 112*a*. The book support 120 includes a frame 122. In the preferred embodiment, the frame 22 is made of wood. However, it is envisioned that other materials, such as plastic, may be substituted. A planar member 124 is attached to the frame 122. In the preferred embodiment, the planar member 124 is a transparent plastic material so that the patient can see beyond the book support 120 when there is no reading of material thereon. Although a transparent plastic material is preferred, a solid planar material may be used for the planar member 124 without the see-through advantage so stated, supra. The planar member 124 is connected to the frame 122 by screws 126.

The book support 120 is mounted to the tubular member 112*a*, 112*c* so that the book support can slide between the triangular members 110, 111. In the preferred embodiment apertures 128 are drilled through the vertical portions 130 of the frame 122. The apertures 128 are sized for receiving the tubular members 112*a*, 112*c* therethrough.

The lower horizontal portion of the frame 122 extends at a right angle from the vertical portions 130 to form a ledge 132 for placement of the book or other reading material. The ledge 132 extends from cut out portions 134 in the vertical positions 130. The ledge 132 is secured to the frame 122 by adhesive located in the cut out portions 134.

A dowel 136 is used for holding flat a book placed on the ledge 132 against planar member 124. The dowel 136 is used for holding flat a book placed on the planar member 124. The dowel 136 is secured in a small aperture 138 drilled in the center of the ledge 132 and extends vertically upward adjacent the planar member 124. As can be seen in FIG. 7, the dowel 136 may be moved slightly way from the planar member 124 for placing a book behind the dowel 136 or for turning a page of the reading material. The dowel 136 is biased to remain adjacent and parallel to the planar member 124.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A moveable book and table holder for a hospital bed having a pair of elongate side rails, said holder comprising:

a rectangular structure sized for disposition over the bed and having opposing longitudinal edges and opposing lateral edges and a predetermined depth;

hooks configured to complement the shape of the side rails, at least a pair of the hooks extending from each opposing lateral edge of the structure configured for supporting on a top edge of the elongate side rails in response to solely vertical movement onto the elongate side rails, each of the hooks having an outer surface and an inner surface, said outer and inner surfaces meeting and terminating at a free end and at an opposing end connected to the structure, said inner surface supportable on a top edge of the elongate side rails, the rectangular structure having a planar upper surface with at least one predetermined sized cavity formed therein for disposal of miscellaneous items, said at least one cavity positioned in a center of the structure and defined by walls spaced from the longitudinal and lateral edges of the rectangular structure; and a tray removably positionable over the rectangular structure, said tray having a rectangular configuration including opposing longitudinal edges and opposing lateral edges, said tray having a peripheral edge and a raised lip around the entire peripheral edge of the tray for containing items placed therebetween, a planar top and bottom surface and a pair of brackets extending perpendicular in a fixed position from the bottom surface of the tray, said brackets fixedly secured to the bottom surface of the tray and extending parallel to each other and spaced inwardly from the longitudinal edges of the tray, said brackets spaced from each other at a distance to lay adjacent the opposing longitudinal edges of the rectangular structure, said brackets having a length longer than the predetermined depth of the rectangular structure and the brackets extending below the bottom surface of the rectangular structure when positioned on the rectangular structure.

2. The holder of claim 1, wherein the tray slidably moves along the longitudinal edges of the rectangular structure, between opposing hooks.

3. The holder of claim 1, wherein the brackets are planar members spaced slightly greater than the length of the rectangular structure.

4. The holder of claim 1, further comprising at least one brace bar secured to the bottom surface of the tray, and the pair of brackets secured to the at least one brace bar.

5. The holder of claim 1, further comprising at least one brace bar secured to a bottom surface of the tray, each of the pair of brackets having at least one notch positioned for receiving and securing a portion of the brace bar therein, an upper edge of the brackets positioned adjacent and flush against the bottom surface of the tray.

6. The holder of claim 1, wherein the at least one predetermined sized cavity had a depth less than the predetermined depth of the rectangular structure.

7. The holder of claim 1, wherein the tray slidably moves only within the confines between the opposing hooks.

8. The holder of claim 3, wherein the brackets are positioned inward of at least two opposing peripheral edges of the bottom surface of the tray.

9. A moveable book table holder for hospital bed having a side rail along each lateral side of the bed, said holder comprising:

a rectangular structure sized for disposition over the bed between the side rails, said structure having opposing longitudinal edges and opposing lateral edges and a predetermined depth, the structure having a planar surface with at least one cavity formed therein for disposal of miscellaneous items, said at least one cavity positioned in a center portion of the structure and defined by walls spaced from the longitudinal and lateral edges, said at least one cavity spaced from the longitudinal and lateral edges by portions of the planar surface;

a pair of hooks extending from each opposing lateral edge of the structure, each hook having an outer arcuate surface and an inner arcuate surface having a same arcuate direction as the outer arcuate surface, said outer and inner arcuate surfaces meeting and terminating at a free end and at an opposing end connected to the lateral edge of the structure, each inner arcuate surface configured for supporting on the side rails when the structure is disposed on the side rails, each hook extending fixedly from the respective lateral edge and having a configuration sized to embrace only an upper surface of the respective rail so as to allow placement of the structure relative to the rails in response to solely vertical movement onto the rails, wherein the rectangular structure is fixed stationary relative to each of the pair of hooks extending from the opposing lateral edges;

a tray removably positionable over the rectangular structure, said tray having a rectangular configuration and including opposing longitudinal edges and opposing lateral edges, said tray having a rectangular peripheral edge and a raised lip extending around the entire outer peripheral edge of the tray, a flat planar top surface extending continuously between the entire peripheral edge of the tray, and a bottom planar surface; and a pair of brackets extending perpendicular from a center portion of the bottom planar surface and spaced from the longitudinal edges of the tray said brackets fixedly secured to the bottom surface of the tray and extending parallel to each other and to the longitudinal edges of the tray, said brackets spaced from each other at a distance to lay adjacent the opposing longitudinal edges of the rectangular structure, wherein portions of the flat planar top surface extend beyond the pair of brackets, and said portions of the planar top surface also extending beyond the longitudinal edges of the rectangular structure when positioned over the structure, said brackets having a length longer than the predetermined depth of the rectangular structure to prevent tipping of the tray when positioned on the rectangular structure.

* * * * *